US012085045B1

(12) United States Patent
Peters et al.

(10) Patent No.: US 12,085,045 B1
(45) Date of Patent: Sep. 10, 2024

(54) LOW STICTION VANE PUMP FOR EVAPORATIVE EMISSIONS SYSTEM

(71) Applicant: STONERIDGE CONTROL DEVICES, INC., Novi, MI (US)

(72) Inventors: Mark William Peters, Wolverine Lake, MI (US); Trevor Adam Pryor, Galion, OH (US)

(73) Assignee: STONERIDGE CONTROL DEVICES, INC., Novi, MI (US)

( * ) Notice: Subject to any disclaimer, the term of this patent is extended or adjusted under 35 U.S.C. 154(b) by 0 days.

(21) Appl. No.: 18/364,098

(22) Filed: Aug. 2, 2023

(51) Int. Cl.
*F02M 25/00* (2006.01)
*F02M 25/08* (2006.01)

(52) U.S. Cl.
CPC ............................... *F02M 25/0836* (2013.01)

(58) Field of Classification Search
CPC .................................................. F02M 25/0836
See application file for complete search history.

(56) References Cited

U.S. PATENT DOCUMENTS 3,386,648 A * 6/1968 Van Rossem ....... F04C 18/3442 418/2
3,877,853 A * 4/1975 Harlin .................. F04C 29/025 184/6.16
4,421,823 A * 12/1983 Theisen .................. B32B 27/08 156/244.11
4,523,897 A * 6/1985 Lower ................... F04C 23/001 417/244
4,958,992 A * 9/1990 Winiger .................. F04C 14/22 418/256
6,776,136 B1 * 8/2004 Kazempour ............ F01C 21/06 123/243
7,484,944 B2 * 2/2009 Kasmer ................... F04C 14/20 418/268
8,794,943 B2 * 8/2014 Pekrul ....................... F22B 1/18 418/137
2004/0013554 A1 * 1/2004 Stellnert ............... F01C 21/104 418/75
2004/0170516 A1 * 9/2004 Hinchey, Jr. .......... F04C 29/065 418/181
2008/0219873 A1 * 9/2008 Nishikata ............ F04C 18/3442 418/77

(Continued)

FOREIGN PATENT DOCUMENTS

WO WO-2021067031 A1 * 4/2021 ............ F01C 21/108

*Primary Examiner* — Phutthiwat Wongwian
*Assistant Examiner* — Sherman D Manley
(74) *Attorney, Agent, or Firm* — Carlson, Gaskey & Olds, P.C.

(57) ABSTRACT

A vane pump includes a housing that provides a bore in fluid communication with an inlet passageway and an outlet passageway, and a rotary assembly that is arranged within and configured to rotate relative to the bore. The rotary assembly includes a rotor that is mounted to a shaft and has multiple slots. The rotor has a first and second faces that engage the housing. A vane is received in each of the slots, each vane has first and second surfaces that extend a length in a longitudinal direction from a first end portion to a second end portion. The first end portion is received in its respective slots. The rotary assembly includes a recess on at least one of the first face, the second face, the first surface of the first portion, and the second surface of the first portion.

12 Claims, 6 Drawing Sheets

(56) References Cited

U.S. PATENT DOCUMENTS

| | | | | |
|---|---|---|---|---|
| 2008/0219875 | A1* | 9/2008 | Nishikata | F04C 2/3442<br>418/104 |
| 2014/0234150 | A1* | 8/2014 | Sugihara | F04C 2/3446<br>418/260 |
| 2017/0328806 | A1* | 11/2017 | Kaneko | G01M 3/26 |
| 2022/0049698 | A1* | 2/2022 | Nishikawa | F04C 29/12 |
| 2022/0403801 | A1* | 12/2022 | Steinman | F02M 25/0836 |
| 2023/0083167 | A1* | 3/2023 | Tuckey | F04C 29/12<br>418/268 |

* cited by examiner

LOW STICTION VANE PUMP FOR EVAPORATIVE EMISSIONS SYSTEM

TECHNICAL FIELD

The disclosure relates to vane pump and an evaporative emissions system incorporating a vane pump.

BACKGROUND

Evaporative emissions systems have long been required for gasoline powered vehicles. The system must undergo a leak test during a vehicle start-up procedure to ensure that fuel vapors will not leak into the atmosphere. A pump is used either to create a vacuum or pressurize the system. An external filter is used to prevent contamination that could damage the pump or other components of the system during operation. Various valves may be closed during this test procedure to maintain system pressure, and the pressure is monitored to determine if there are any leaks.

When a leak is present in the evaporative system at high ambient temperatures (>35° C.), gasoline vapors (VOC) vented through the leak exceeds the design intent of a properly functioning evaporative system. Over the course of 24 hours, the gases released through a 1.0 mm leak from the vapor dome of the fuel tank can exceed evaporative leak regulations by more than 10 times the allowable amount. Therefore, it is desirable to provide an evaporative emissions system leak test that is able to quickly and accurately detect a leak in the system.

Vane pumps are designed such that the vane extends outward from the centerline from its supporting rotor during operation, which compresses and flows air through a pumping chamber. Vanes are typically aligned perpendicular to the drive shaft and slide within a respective slot in the rotor as the vane follows the contour of the chamber wall during rotation of the rotor. Existing technology uses vanes that are rectangular in design with smooth, uniform surfaces on all running surfaces of the rotor and the vanes.

SUMMARY

In one exemplary embodiment, a vane pump includes a housing that provides a bore in fluid communication with an inlet passageway and an outlet passageway, and a rotary assembly that is arranged within and configured to rotate relative to the bore. The rotary assembly includes a rotor that is mounted to a shaft and has multiple slots. The rotor has a first and second faces that engage the housing. A vane is received in each of the slots, each vane has first and second surfaces that extend a length in a longitudinal direction from a first end portion to a second end portion. The first end portion is received in its respective slots. The rotary assembly includes a recess on at least one of the first face, the second face, the first surface of the first portion, and the second surface of the first portion.

In a further embodiment of any of the above, each vane includes a substantially rectangular cross-section that is provided by spaced apart short sides that are joined by spaced apart long sides. The long sides are provided by the first and second surfaces, and the recess is provided on at least one of the first and second surfaces.

In a further embodiment of any of the above, the short sides extend a first width in a thickness direction transverse to the longitudinal direction, and the long sides extend a height direction transverse to the longitudinal and thickness directions, and the recess has a second width in the thickness direction that is less than the first width.

In a further embodiment of any of the above, the slot has a slot width, a slot height, and a slot depth. The first width is approximately equal to the slot width, and the first portion has the first width arranged at least partially within the slot depth during operation of the vane pump.

In a further embodiment of any of the above, multiple recesses are provided on each vane.

In a further embodiment of any of the above, at least one recess is provided on each of the first and second surfaces.

In a further embodiment of any of the above, the recess extends to a terminal end of the second portion.

In a further embodiment of any of the above, the recess is provided on at least one of the first and second faces.

In a further embodiment of any of the above, each of the first and second faces is bounded by an outer perimeter, and the recess is contained entirely within the outer perimeter.

In a further embodiment of any of the above, the rotor and the vanes are plastic, and the recess is defined by a molded surface.

In a further embodiment of any of the above, the vane pump includes a motor that is connected to the rotary assembly by the shaft.

In another exemplary embodiment, an evaporative emissions system including the vane pump includes a fuel system including a fuel tank and a charcoal canister, the fuel system contains vapor. At least one valve that is arranged in a closed position during a leak detection procedure. The vane pump includes a motor that is connected to the rotary assembly by the shaft. A controller is in communication with the pump, the controller is configured to maintain a pressure on the system with the vane pump during a leak test procedure. The rotary assembly is configured to collect the vapor in the recess during operation.

In a further embodiment of any of the above, each vane includes a substantially rectangular cross-section that is provided by spaced apart short sides joined by spaced apart long sides. The long sides are provided by the first and second surfaces, and the recess is provided on at least one of the first and second surfaces.

In a further embodiment of any of the above, the short sides extend a first width in a thickness direction transverse to the longitudinal direction, and the long sides extend a height direction transverse to the longitudinal and thickness directions. The recess has a second width in the thickness direction that is less than the first width. The slot has a slot width, a slot height, and a slot depth. The first width is approximately equal to the slot width, and the first portion has the first width arranged at least partially within the slot depth during operation of the vane pump.

In a further embodiment of any of the above, the recess is provided on at least one of the first and second faces.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
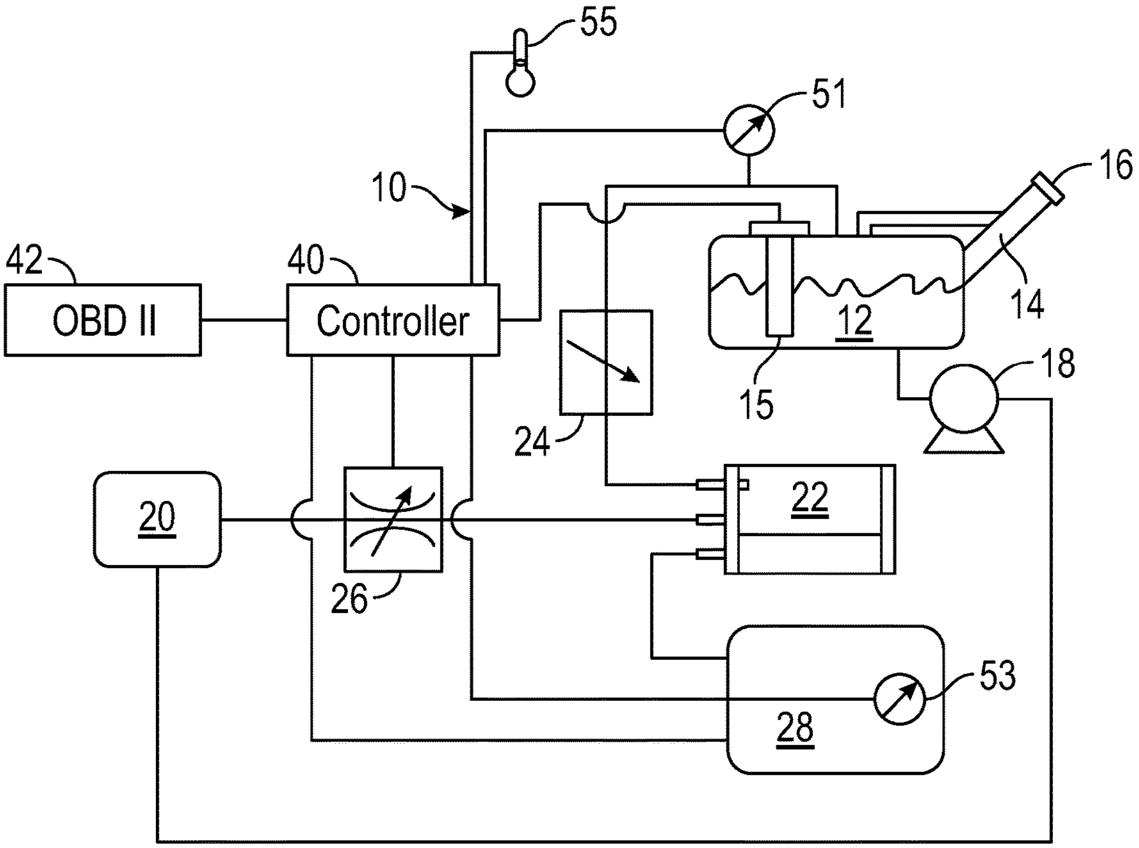
FIG. 1A schematically illustrates portions of one example evaporative fuel system.

FIG. 1A schematically illustrates a portion of an example evaporative fuel system 10. The system 10 includes a fuel tank 12 having a fuel filler 14 with a fill cap 16. A fuel pump 18 supplies gasoline, for example, from the fuel tank 12 to an internal combustion engine 20. A fuel level sensor 15 is in communication with a controller 40 and measures a level of fuel within the fuel tank 12, which also correlates to an amount of fuel vapor within the fuel tank 12.

The system 10 is configured to capture and regulate the flow of fuel vapors within the system. In one example, a fuel tank isolation valve 24 is arranged fluidly between the fuel tank 12 and a charcoal canister 22, which captures and stores fuel vapors for later use by the engine 20. A purge valve 26 is fluidly connected between the canister 22 and the engine 20. The controller 40 regulates a position of the purge valve 26 to selectively provide the fuel vapors to the engine 20 during operation to make use of these fuel vapors.

The integrity of the system 10 must be periodically tested to ensure no fuel vapors can leak from the system 10. One type of system 10 uses a leak detection module (LDM) 28, which can be used to pull a vacuum and/or pressurize the system to determine whether a leak exists, for example, using a pressure transducer 53. In one example leak test procedure, the purge valve 26 is closed and the controller 40 operates the leak detection module 28 to evacuate or pressurize the system. Another pressure transducer 51 may be used to monitor the pressure of fuel vapors within the fuel tank 12 during other conditions. An ambient temperature sensor 55, which is optional, is in communication with the controller 40. The temperature sensor 55 may be useful for quantify heat transfer characteristics of the fuel vapor within the fuel tank 12 relative to surrounding atmospheric temperature.

Figure 1B:
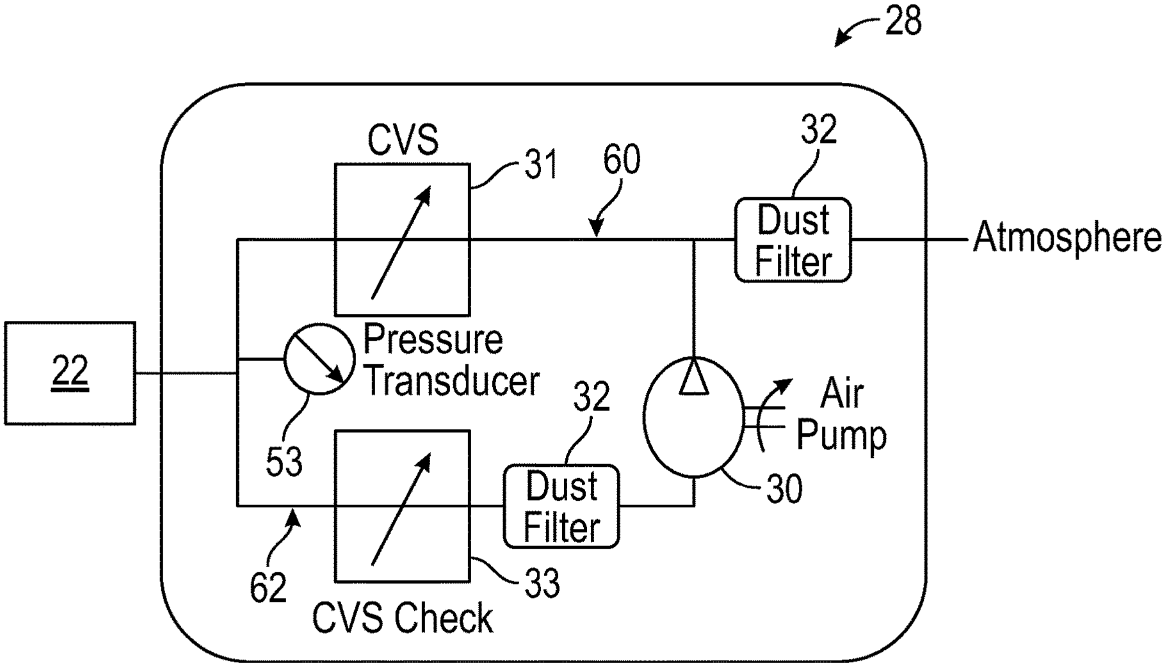
FIG. 1B is a schematic view of a leak detection module (LDM) for the system shown in FIG. 1A.

The LDM 28 is schematically shown in FIG. 1B. The LDM 28 includes a pump 30 arranged in a housing. One example pump is disclosed in U.S. application Ser. No. 17/765,628 filed on Mar. 31, 2022, entitled "PUMP FOR EVAPORATIVE EMISSIONS SYSTEM", which is incorporated herein by referenced in its entirety. Some customers prefer a system that operates using a vacuum, while other customers prefer a system that is pressurized. So, to provide a pressurized evaporative emissions system test, the pump 30 will draw air from atmosphere through a filter 32 and direct the air towards the canister 22. Another filter 34 may be provided on the other side of the pump 30 to protect the pump from debris. To provide a depressurized or negative pressure evaporative emissions system test (i.e., vacuum), the pump 30 will draw air from the canister 22 and out to the atmosphere. One example leak detection method is disclosed in U.S. application Ser. No. 18/023,523 filed on Feb. 27, 2023, entitled "LEAK DETECTION MODULE ENTROPY METHOD FOR EVAPORATIVE EMISSION SYSTEM", which is incorporated herein by referenced in its entirety.

In one example, when the LDM 28 is not performing a leak check of the fuel system 10, a canister valve solenoid (CVS) 31 is in an open position to allow air to pass through a first fluid passageway 61 between the rest of the system 10 and atmosphere. This enables the system 10 to draw air from the atmosphere as needed.

When the LDM 28 is performing a leak test of the of the fuel system 10, the CVS 31 is in a closed position, which provides a second fluid passageway 63 on the side of the canister 22. A CVS check valve 33 is arranged in the second fluid passageway 63 and selectively blocks the canister 22 from the pump 30 and atmosphere. The pressure transducer 53 is arranged to read the pressure in the second fluid passageway 63 when the CVS 31 is closed, although the pressure transducer can be used for other purposes.

The LDM 28 contains the hardware necessary to determine if the system 10 has a leak to atmosphere. During a leak test, depending upon how the CVS check valve 33 that is used to decouple the pump 30 from the volume of air that is being check for leaks. The pump 30 can either create a negative pressure (vacuum) or a positive pressure in the evaporative emissions system depending upon its direction of rotation as described above. The leak boundary of the system 10 includes the fuel filler 14 and cap 16, the purge valve 26, the fresh air side of the canister 22 (side connected to the LDM 28), the vapor dome of the fuel tank 12, and vapor lines connecting all components, including the second fluid passageway 63.

During the leak test, the pressure transducer 53 is in fluid communication with the second fluid passageway 63 and monitors the pressure condition generated by the pump 60 in the system 10. The pressure transducer 53 is in communication with the controller 40, which determines if there is a variation in pressure over a predetermined amount of time in the evaporative emissions system that might indicate a leak. Any change in pressure detected by the pressure transducer 53, which is monitored by the controller 40, is indicative of a leak. An OBDII diagnostics system 41 communicates with the controller 40 and uses the pressure information from the pressure transducer to generate engine malfunction codes that may be stored and for illuminating a "check engine" light on the vehicle instrument panel indicating vehicle service is needed. One example diagnostic system is disclosed in U.S. application Ser. No. 17/882,055 filed on Aug. 5, 2022, entitled "EVAPORATIVE EMISSIONS LEAK CHECK MODULE WITH INTEGRATED CONTROL AND COMMUNICATIONS SYSTEM", which is incorporated herein by reference in its entirety.

The controller 40 and OBDII system 41 may be integrated or separate. In terms of hardware architecture, such a controller can include a processor, memory, and one or more input and/or output (I/O) device interface(s) that are communicatively coupled via a local interface. The local interface can include, for example but not limited to, one or more buses and/or other wired (e.g., CAN, LIN and/or LAN) or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller may be a hardware device for executing software, particularly software stored in memory. The processor can be a custom made or commercially available processor, a central processing unit (CPU), an auxiliary processor among several processors associated with the controller, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

When the controller is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Figure 2B:
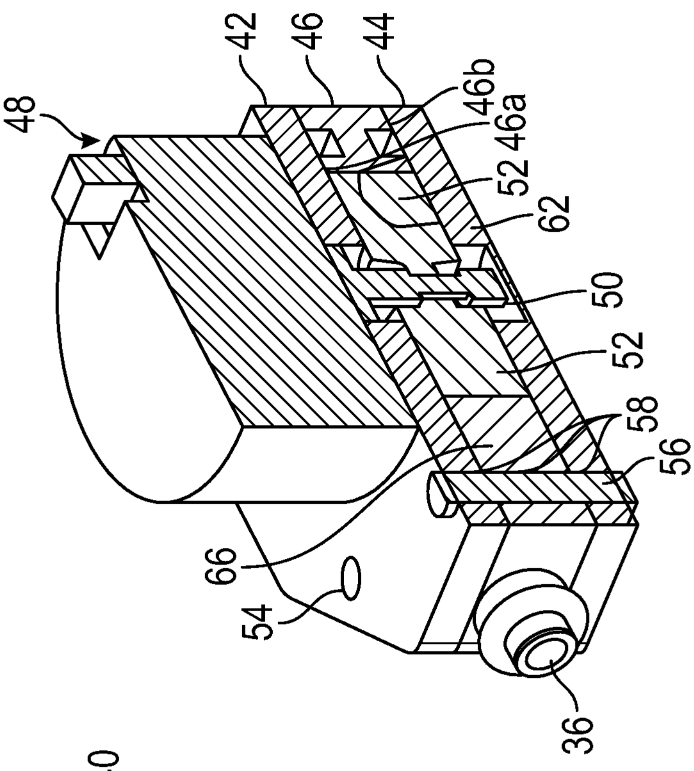
FIG. 2B is a cross-sectional view of the pump of FIG. 2A taken along lines 2B-2B.
Figure 2A:
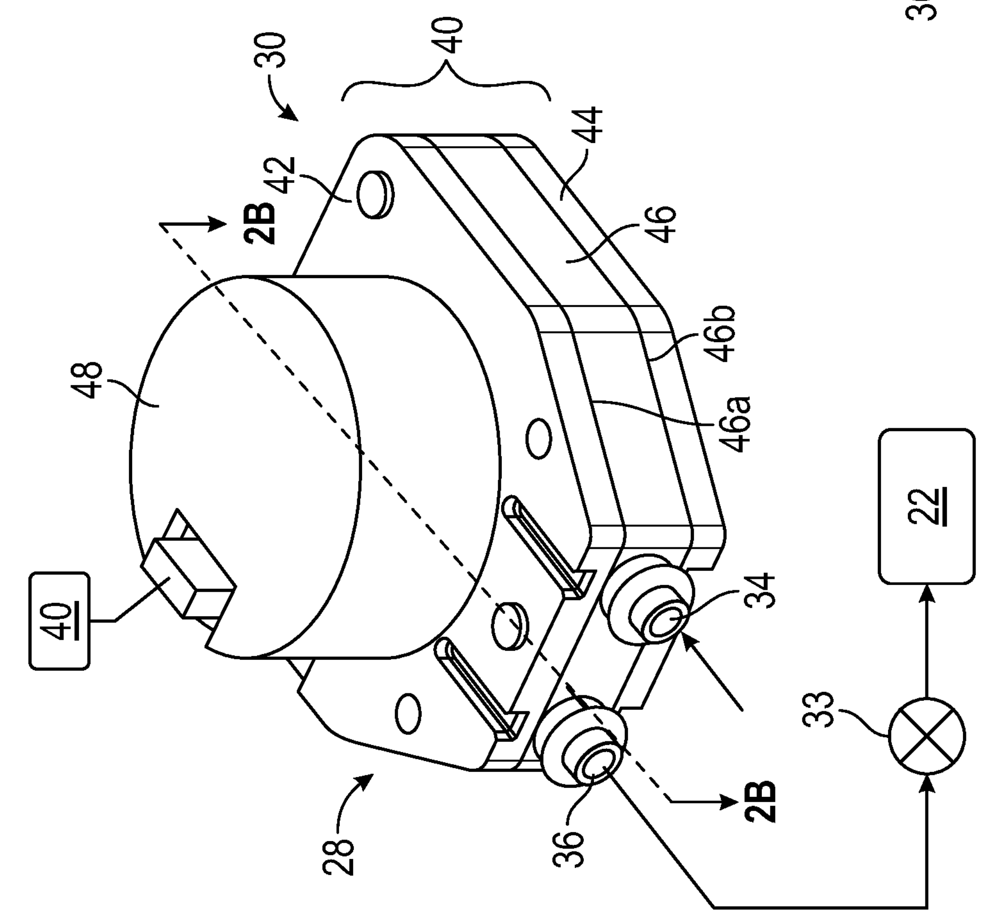
FIG. 2A is a perspective view of one example rotary vane pump.

One example leak detection module 28 is shown in more detail in FIG. 2A. The module 28 includes the pump 30, which receives atmospheric air through an inlet port 34. The pump provides pressurized air to an outlet port 36, which may be supplied through a check valve 33 to the charcoal canister 22 or other evaporative component of the system 10.

Figure 5:
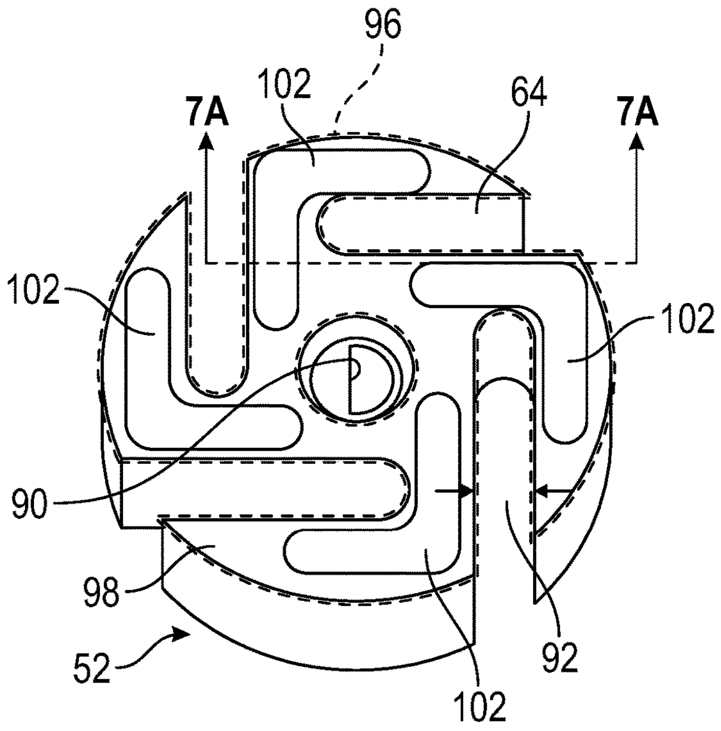
FIG. 5 is a top view of a rotor.

The pump 30 has a housing 40 that is constructed from first and second plates 42, 44 secured on either side of an intermediate plate 46. It should be understood that the pump 30 may be constructed in a different manner than disclosed. For example, an intermediate plate need not be used. In the example, the inlet and outlet ports 34, 36 are provided on an edge of the intermediate plate 46 rather than being provided on one or both of the first and second plates 42, 44. Referring to FIGS. 2A and 2B, the intermediate plate 46 has a first side 46*a* adjacent to and in abutment with the first plate 42, and a second side 46*b* is adjacent to and in abutment with the second plate 44. In the example, the first and second sides 46*a*, 46*b* abut and engage the first and second plates 42, 44. A motor 48 is mounted to the first plate and rotationally drives a rotor 52 received in a bore 62 of the intermediate plate 46 via a shaft 50. The rotor 52 includes a hole 90 (FIG. 5) that keys the rotor 52 to the shaft 50.

In the example, the first, second, and intermediate plates 42, 44, 46 are constructed from a plastic material, such as nylon or polypropylene, for example, which may be graphite- or Teflon-filled. In one example, the plastic is injection molded, which provides surfaces having characteristics that are identifiable and indicative of the molding process (such as shrinkage and flow lines). The plates 42, 44, 46 include at least two locator holes 54 that are each configured to temporarily receive a through-pin during assembly of the pump 30 to precisely align the plates with one another. Fasteners 56 are received in fastener holes 58 in the first, second, and intermediate plates 42, 44, 46. In the example, the ends of the fasteners 56, which may be metal, are plastically deformed to securely retain the first and second plates 42, 44 in a clamping relationship about the intermediate plate 46. Threaded fasteners, rivets or other types of fastening may also be used.

Figure 3B:
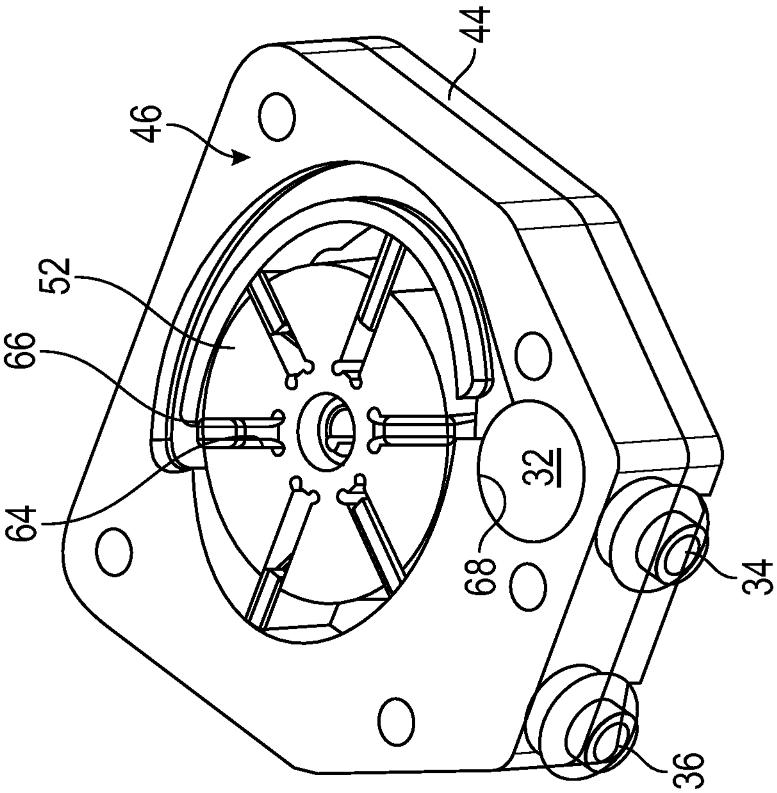
FIG. 3B is a perspective view of the intermediate plate with a filter installed.
Figure 3A:
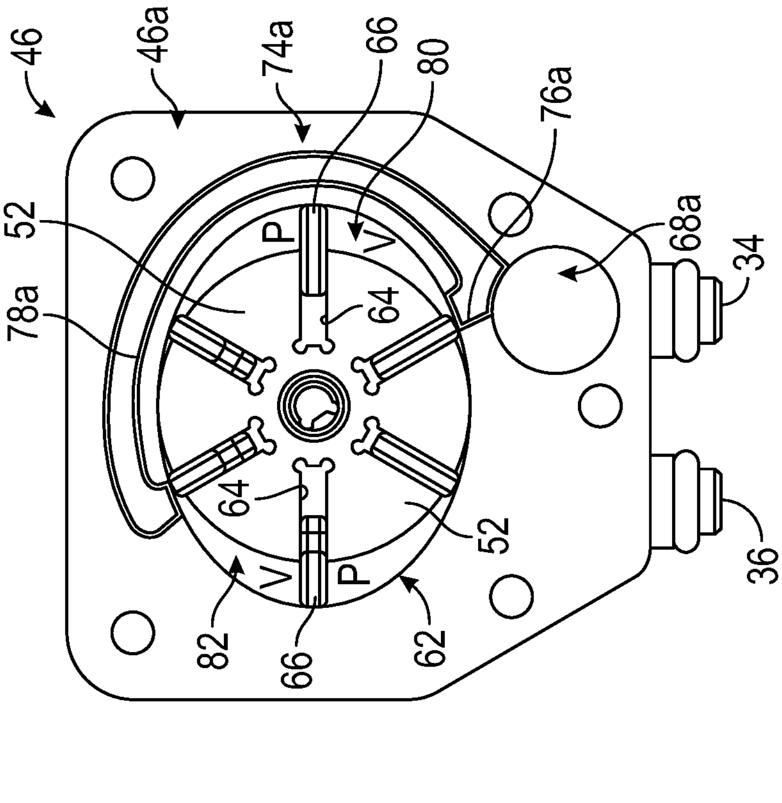
FIG. 3A illustrates an elevation view of the pump with a first plate removed, exposing a rotor in an intermediate plate.

The example pump 30 is a rotary vane configuration. Referring to FIGS. 3A and 3B, an elliptical bore 62 is illustrated. However, a round bore with an offset rotor may be used instead, if desired. The rotor 52 includes multiple slots 64 about its circumference. The slots 64 slidably receive vanes 66 that are moveable within the slot to seal against the periphery of the bore 62 from centrifugal forces, as is known in rotary vane pumps. For the elliptical bore 62, two cavities 80, 82 are provided to create a two-chamber configuration that balances pressure across the rotor 52.

Figure 4B:
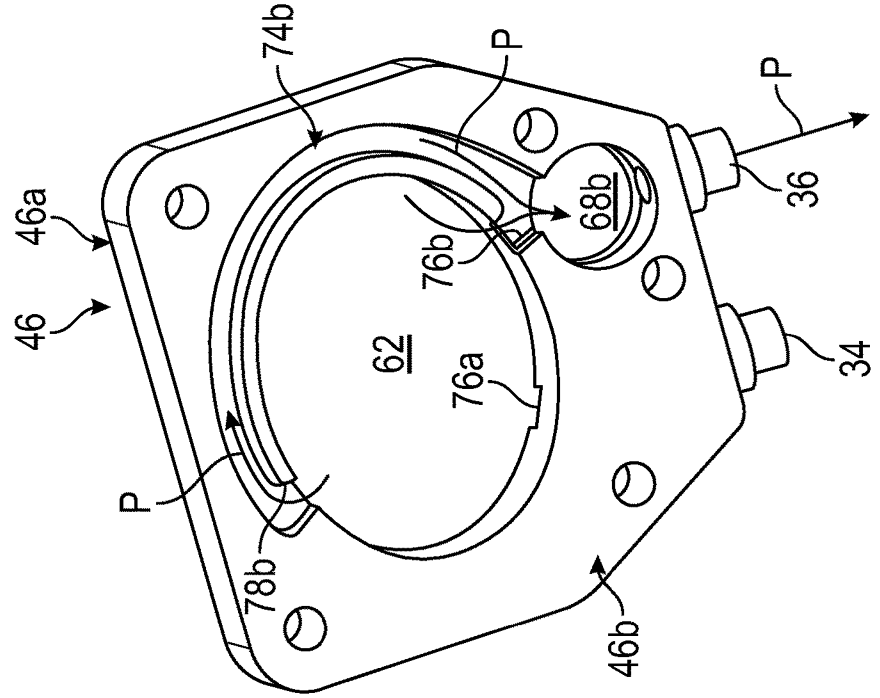
FIGS. 4A and 4B respectively are first and second side perspective views of the intermediate plate shown in FIG. 3B.
Figure 4A:
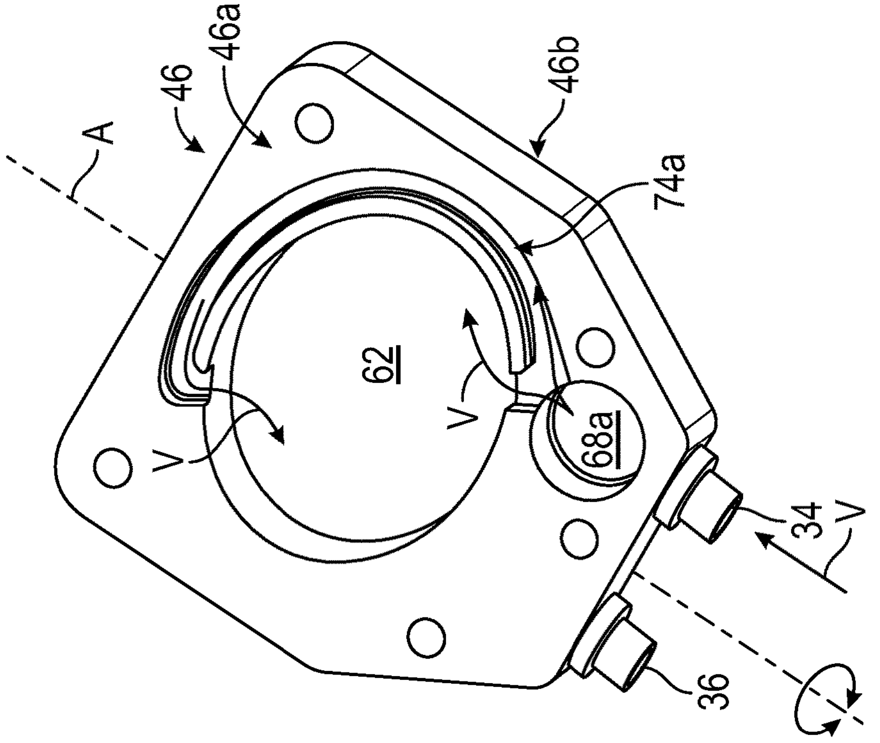

A passage 74*a* on the first side 46*a* fluidly connects the inlet 34 to the bore 62, as shown in FIGS. 3A and 4A. The first passage 74*a* includes a first passageway 76*a* fluidly connected to the ambient side V of first cavity 80 and a second passageway 78*a* fluidly connected to the ambient side V the second cavity 82. The pocket 68*a* is arranged in the first passage 74*a* fluidly between the inlet port 34 and the bore 62.

In a similar manner, a second passage 74*b* on the second side 46*b* fluidly connects the outlet 36 to the bore 62, as shown in FIG. 4B. The second passage 74*b* includes a second passageway 76*b* fluidly connected pressure side P of the second cavity 82 and a second passageway 78*b* fluidly connected to the pressure side P of the first cavity 80. The pocket 68*b* is arranged in the second passage 74*b* fluidly between the outlet port 36 and the bore 62.

At least one of the pockets 68*a*, 68*b* receives a filter 32 (e.g., foam), but both pockets 68*a*, 68*b* may include a filter 32 if desired. In this manner, contaminants are filtered from the system 10 and no external lines or fittings are needed as the internal filter is contained within the pump 30. The LDM 28 does not require protection against ISO ultrafine dust (1-22 micron) due to its lack of a calibration orifice, which is incorporated in some types of leak detection pumps. The type of foam filter elements which may be incorporated into the LDM 28 may not prevent ultrafine dust from entering the pump assembly. But, this is not a risk to pump performance due to the relatively low concentration of dust relative to the volume of air passing through the pump 30.

Pumps that are designed to move fluids, rely on lubrication from the material that is being pumped. Since air pumps due do not have a liquid to lubricate the rotating components during vane extension, the pump on centrifugal force to extend the vanes. Condensation in a vane pump, such as (water) vapor in the fuel system 10, can cause stiction of the rotating and sliding components due to the adhesion generated between two wetted surfaces. The disclosed vane pump decreases stiction in the presence of vapor by providing one or more channels or recesses that allow condensation to puddle and/or provide an exit path along the vane due centrifugal force generated during rotation.

The pump 30 includes a housing providing by one or more of the plates 42, 44, 46 described above. The bore 62 is in fluid communication with an inlet passageway and an outlet passageway (e.g., passages 74*a*, 74*b*). These passageways may be configured in any suitable manner to supply air to and from the bore 62 for the fuel system 10.

A rotary assembly, comprising the rotor 52 and the vanes 66, is arranged within and configured to rotate relative to the bore 62. A volume is provided circumferentially between adjacent vanes 66, forming chambers which change size during rotation to generate a pressure differential across the pump 30. As the rotary assembly is driven by the motor 48, centrifugal force slides each vane 66 relative to its respective slot 64 radially outward into sealing engagement with the perimeter wall of the bore 62. Since each vane 66 must rapidly slide in and out relative to its slot during rotation, any stiction inhibiting this sliding movement can prevent the vanes 66 from sealing thus resulting in an inability of the pump 30 to reach its desired pressure.

To reduce the effects of stiction (particularly in the presence of vapor), one or more recesses are provided in the rotary assembly at rotating and/or sliding interfaces. However, the recesses are configured such that the pressurized air cannot leak past the rotor 52 or vanes 66 from a higher pressure chamber to a lower pressure chamber.

Figure 7A:
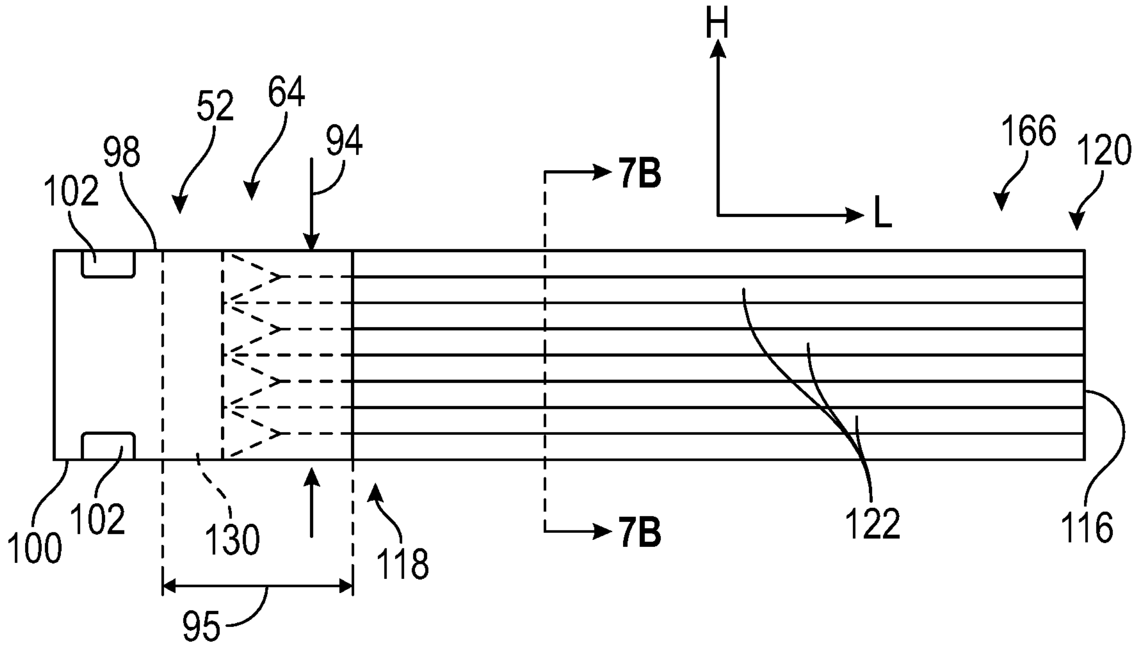
FIG. 7A is a side view of another example vane.

The rotor 52 has first and second faces 98, 100 opposite one another (FIGS. 5 and 7A) that engage and rotate relative to the housing during operation. To reduce stiction between the rotor 52 and the housing, at least one recess 102 is provided on at least one of the first and second faces 98, 100. In the example, multiple L-shaped recesses are provided. Each of the first and second faces 98, 100 is bounded by an outer perimeter 96 (dashed line), and the recesses 102 are contained entirely within the outer perimeter 96. This better prevents leakage from one chamber to another.

Figure 6:
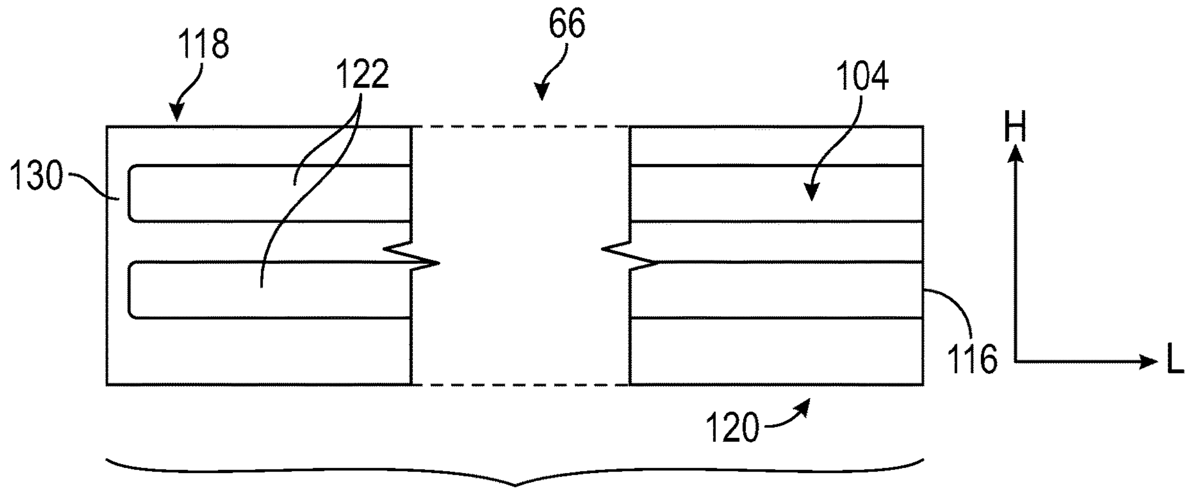
FIG. 6 is a broken, side view of a vane.
Figure 7B:
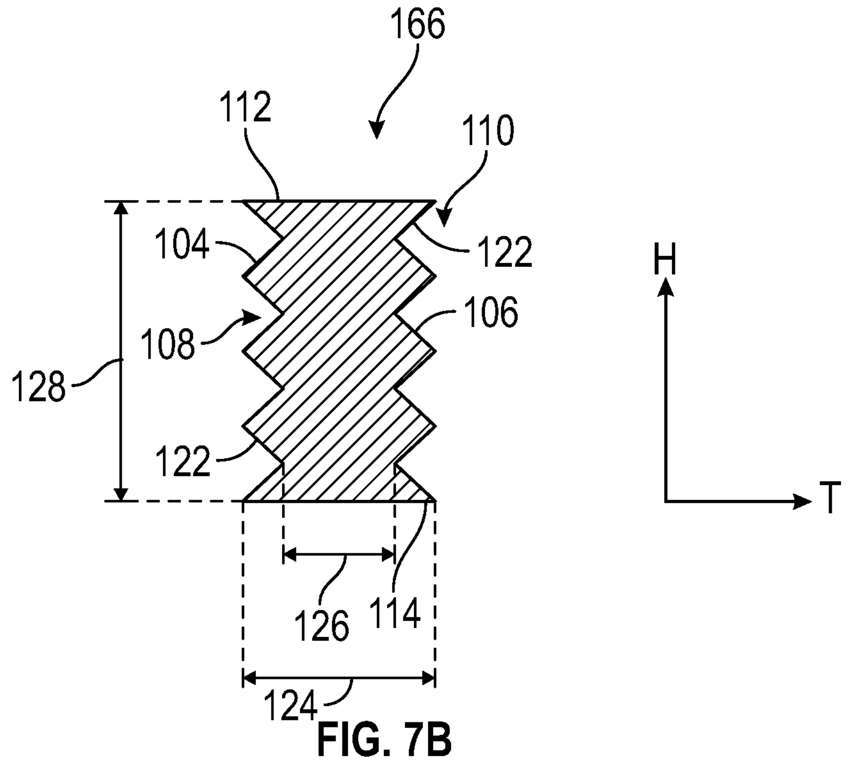
FIG. 7B is an end view of the vane shown in FIG. 7A.

Example vanes 66, 166 are shown in FIGS. 6-7B and are referred to generally as "vane 66". Each vane 66 has a substantially rectangular cross-section provided by spaced apart short sides 112, 114 joined by spaced apart long sides 108, 110. The long sides 108, 110 provide the first and second surfaces 104, 106. The short sides 112, 114 extend a first width 124 in a thickness direction T transverse to the longitudinal direction L. The long sides 108, 110 extend a height 128 in a height direction H transverse to the longitudinal and thickness directions L, T. The slot 66 has a slot width 92, a slot height 94, and a slot depth 95. The first width 124 is approximately equal to the slot width 92, and the first portion 118 has the first width 124 arranged at least partially within the slot depth 95 during operation of the pump 30. Using the recesses 122 of this disclosure, the contact at the interface between the first portion 118 and the slot 64 is decreased by about 50% in one example.

Each vane 66, received in a respective one of the slots 66, extends a length in a longitudinal direction L from a first end portion 118 to a second end portion 120. The first end portion 118 is received in its respective slot 66, and the second end portion 120 has a terminal end 116 that engages the perimeter wall of the bore 62.

To reduce stiction between the vanes 66 and the rotor slots 64 one or more recesses 122 are provided on at least one of the first and second surfaces 104, 106. The recesses 122 have a second width 126 in the thickness direction T, which provides a sufficient depth to collect any condensed vapor. The second width 126, which corresponds to the thickness of the vane 66 at the recess 122, is less than the first width 124. In the example, the recesses 122 extend to the terminal end 116 of the second portion 120. Centrifugal force funnels the liquid from the interface between the rotor 52 and first portion 118 of the vane 66 so that it can be expelled to the terminal end 116 from these mating surfaces and out the pump's outlet. A wall 130 having the first width 124 and extending in the height direction H extends the full height 128 of the vane 66 to prevent leakage past the vane within the slot 64.

In the example, the rotor 52 and the vanes 66 are constructed from a plastic material suitable for the application. In one example, the recesses 102, 122 are defined by a molded surface, which is structurally identifiable and unique from other types of surfaces, such as a machined surface. A coating may be added to the recesses 102 and/or 122 to enhance liquid shedding from the surfaces, if desired. The geometry of the recesses 102, 122 may be varied depending on the materials used, pump speed, pressure and application.

In operation, the controller 40 communicates with the pump 30 to maintain a pressure on the system. The evaporative emissions system 10 operates the pump 30 substantially free from stiction, enabling the pump 30 to reach the desired pressure for the leak test.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A vane pump comprising:
- a housing providing a bore in fluid communication with an inlet passageway and an outlet passageway;
- a rotary assembly arranged within and configured to rotate relative to the bore;
- the rotary assembly including:
- a rotor mounted to a shaft and having multiple slots, the rotor having a first and second faces engaging the housing;
- a vane received in each of the slots, each vane having first and second surfaces extending a length in a longitudinal direction from a first end portion to a second end portion, the first end portion received in its respective slots; and
- wherein the rotary assembly includes a recess on at least one of the first face, the second face, the first surface of the first end portion, and the second surface of the first end portion, wherein multiple recesses are provided on each vane.

2. The vane pump of claim 1, wherein each vane includes a substantially rectangular cross-section provided by spaced apart short sides joined by spaced apart long sides, the long sides provided by the first and second surfaces, and at least one of the multiple recesses are provided on at least one of the first and second surfaces.

3. The vane pump of claim 2, wherein the short sides extend a first width in a thickness direction transverse to the longitudinal direction, and the long sides extend a height direction transverse to the longitudinal and thickness directions, and at least one of the multiple recesses have a second width in the thickness direction that is less than the first width.

4. The vane pump of claim 3, wherein the slot has a slot width, a slot height, and a slot depth, the first width approximately equal to the slot width, and the first portion having the first width arranged at least partially within the slot depth during operation of the vane pump.

5. The vane pump of claim 1, wherein another of the recess is provided on at least one of the first and second faces.

6. The vane pump of claim 1, wherein each of the first and second faces is bounded by an outer perimeter, and the other of the recess is contained entirely within the outer perimeter.

7. The vane pump of claim 1, wherein the rotor and the vanes are plastic, and the multiple recesses are defined by a molded surface.

8. The vane pump of claim 1, comprising a motor connected to the rotary assembly by the shaft.

9. An evaporative emissions system including the vane pump of claim 1, comprising:

a fuel system including a fuel tank and a charcoal canister, the fuel system containing vapor;

at least one valve arranged in a closed position during a leak detection procedure;

the vane pump including a motor connected to the rotary assembly by the shaft; and a controller in communication with the pump, the controller configured to maintain a pressure on the system with the vane pump during a leak test procedure, the rotary assembly configured to collect the vapor in the recess during operation.

10. A vane pump comprising:

a housing providing a bore in fluid communication with an inlet passageway and an outlet passageway;

a rotary assembly arranged within and configured to rotate relative to the bore;

the rotary assembly including:

a rotor mounted to a shaft and having multiple slots, the rotor having a first and second faces engaging the housing;

a vane received in each of the slots, each vane having first and second surfaces extending a length in a longitudinal direction from a first end portion to a second end portion, the first end portion received in its respective slots; and wherein the rotary assembly includes a recess on at least one of the first face, the second face, the first surface of the first end portion, and the second surface of the first end portion, wherein the recess extends to a terminal end of the second end portion.

11. The vane pump of claim 10, wherein at least one recess is provided on each of the first and second surfaces.

12. A vane pump comprising:

a housing providing a bore in fluid communication with an inlet passageway and an outlet passageway;

a rotary assembly arranged within and configured to rotate relative to the bore;

the rotary assembly including:

a rotor mounted to a shaft and having multiple slots, the rotor having a first and second faces engaging the housing;

a vane received in each of the slots, each vane having first and second surfaces extending a length in a longitudinal direction from a first end portion to a second end portion, the first end portion received in its respective slots; and wherein the rotary assembly includes a recess on at least one of the first face, the second face, the first surface of the first end portion, and the second surface of the first end portion, wherein each vane includes a substantially rectangular cross-section provided by spaced apart short sides joined by spaced apart long sides, the long sides provided by the first and second surfaces, and the recess is provided on at least one of the first and second surfaces, wherein the short sides extend a first width in a thickness direction transverse to the longitudinal direction, and the long sides extend a height direction transverse to the longitudinal and thickness directions, and the recess has a second width in the thickness direction that is less than the first width;

wherein the slot has a slot width, a slot height, and a slot depth, the first width approximately equal to the slot width, and the first end portion having the first width arranged at least partially within the slot depth during operation of the vane pump.

* * * * *